Dec. 25, 1928.  
G. G. MARSHALL  
AIR REGULATING DEVICE FOR AUTOMOBILE RADIATORS  
Filed Oct. 22, 1920  
1,696,208
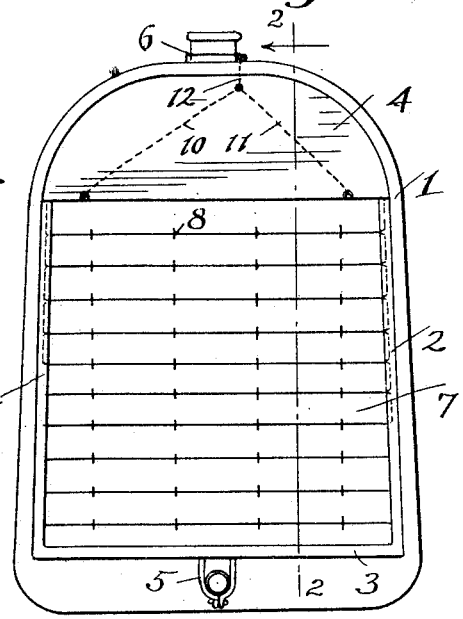
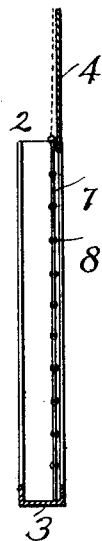
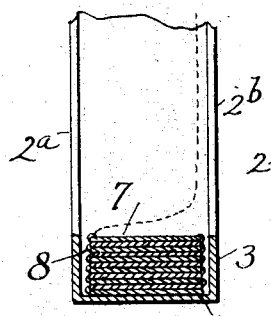
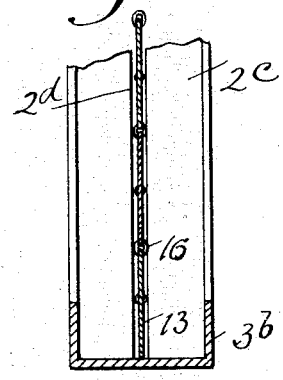
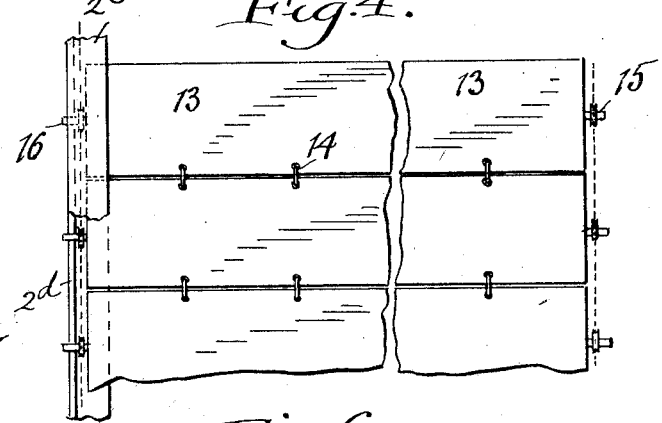
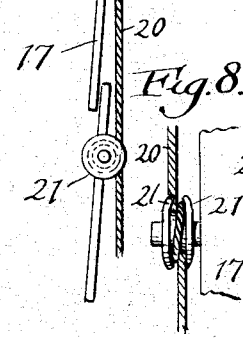
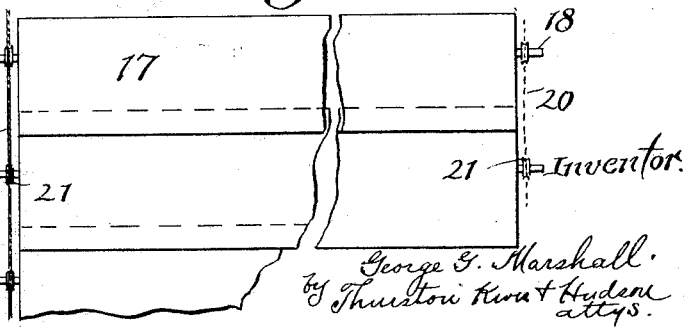
George G. Marshall,
by Thurston Kwis & Hyden
attys.

Patented Dec. 25, 1928.

1,696,208

UNITED STATES PATENT OFFICE.

GEORGE G. MARSHALL, OF CLEVELAND, OHIO.

AIR-REGULATING DEVICE FOR AUTOMOBILE RADIATORS.

Application filed October 22, 1920. Serial No. 418,735.

The present invention relates to a device which is adapted to be associated with an automobile radiator for the purpose of controlling the passage of air through the radiator.

The device is so constituted that it may be made as an independent unit and fastened upon the automobile radiator casing or it may be incorporated as a part of the automobile casing.

The preferable construction of the proposed invention embodies a plurality of shutters which may be made of metal, wood or other material which is substantially indestructible so that the device will withstand the wear and tear incident to its usage.

Reference should be had to the accompanying drawings forming a part of this specification in which Fig. 1 is a front elevation showing a device embodying the present invention as applied to an automobile radiator; Fig. 2 is a section on the line 2—2 of Fig. 1; Fig. 3 is a vertical section through a portion of the device; Fig. 4 shows in front elevation a modified construction; Fig. 5 is a vertical section of the form shown in Fig. 4; Fig. 6 is a front elevation of a modified form of the device; Fig. 7 is a side elevation with portions in section of the device shown in Fig. 6 and Fig. 8 is an elevation of a portion of the device shown in Fig. 6.

Referring to the drawings, 1 indicates what may be termed a frame which has the side members 2 and a connecting bottom member 3. The side members 2 connect with the upper portion which is indicated at 4 which is adapted to extend in front of and lie in contact with the upper portion of the radiator. The whole device which has so far been described, is made as a unitary structure and is secured upon the automobile in any desired manner as by means of clamps such as indicated at 5 and 6.

The side members 2 and the bottom member 3 are preferably made of metal sections, such for instance as general sections although this is not necessarily the case. However, the side members 2 are formed to have a channel shape so that there are inwardly extending side portions 2ª and 2ᵇ of each side member.

Extending transversely between the side members 2 are a series of shutter members which in Fig. 1 are indicated at 7. Each shutter member is of such a length that it extends within the side members 2ª of each of the side pieces 2. It will therefore be apparent that the ends of the shutter members 7 are in position to cooperate with the side flanges of the side members 2 and will be guided when the shutters are raised and lowered in a manner which will be subsequently described.

The shutter members are secured to each other by a hinge construction which in the present instance merely comprises small rings such as indicated at 8 which extend through openings in adjacent shutters. This construction is an entirely flexible construction, so that the shutters may assume a folded position such as indicated at 9 in Fig. 3. The topmost shutter as shown in Fig. 1 is connected with a means for raising and lowering, which in the present instance comprises a cord or cable 10 which is secured to the topmost shutter adjacent one end thereof and a similar cable 11 which is connected with the topmost shutter adjacent the opposite end thereof. These cables 10 and 11 are connected with a cable 12 which preferably is made to extend back to the dashboard of the automobile on which the device is used so that the shutters may be manipulated from the seat of the vehicle.

When the shutters are in what may be termed elevated position, they occupy the position shown in Fig. 1, that is to say, the cable members 10, 11 and 12 have been operated so that they support the topmost shutter and the other shutters have been raised into their vertical position due to the attachment between each of the adjacent shutters as before described. In this position the shutters entirely close the space between the side members 2 of the frame as before described and substantially prevent the passage of air to the radiator proper.

Obviously the shutters may be elevated more or less completely so as to leave more or less of the radiator proper exposed to the passage of air to the same.

When the shutters are lowered by releasing tension on the cables 10, 11 and 12, the lowermost shutter will assume a flat position in contact with the bottom member 3 of the frame and each of the other shutters will in turn fold into this flat position as indicated in Fig. 3. The thickness of the shutter with respect to the height of the bottom member 3 is such that the shutters when in folded position will be retained within the bottom member 3.

Attention is called to the fact that in the structure described the lowermost portion of the radiator is first covered when the shutters 7 are raised and the progression in raising the shutters is from the bottom of the radiator toward the top. This is purposeful for it is a well known fact that in most radiators the upper part of the radiator receives the water of the cooling system directly from the engine and hence the hottest part of the radiator is at the top. In cold weather when it is desirable or necessary to regulate the amount of air, it is desirable to protect the lower part of the radiator in the first instance, as this is the coolest part of the radiator and protecting the same tends to equalize the cooling effect of the air passing through the radiator.

In Figs. 4 and 5 a modified form of the construction before described is shown. So far as the frame with which the shutters cooperate are concerned, it is substantially the same as that which is shown in Fig. 1 and previously described with the exception, however, that the side members 2ᶜ are each provided with a slot 2ᵈ or an equivalent device which serves as a guide for pins carried by the shutter as will now be described.

Each of the shutters 13 is secured to its adjacent shutter by a hinged construction as indicated at 14, so that so far as the connection between the shutters is concerned, it may be precisely the same as that which has before been described. Each of the shutters is provided with pins 15 and 16 which extend outwardly from the ends of each of the shutters and these pins are adapted to extend into the slot 2ᵈ or the equivalent guiding means so that as the shutters are raised and lowered they are guided. The slot 2ᵈ or the equivalent guiding means is slightly wider than the thickness of the pins 15 and 16 so that the shutters may readily move from the horizontal to the vertical position in raising the shutter structure or vice versa in lowering the shutter structure.

The guiding members 15 and 16 on each of the shutters absolutely insure the proper holding of the shutters and furthermore prevent swinging or undue movement of the shutters when in elevated position.

In Figs. 6, 7 and 8 a slightly different structure is shown in so far as the shutters and their operation is concerned.

The frame which cooperates with the shutters such as shown in Figs. 6 to 8, is the same in all substantial respects as that shown either in Fig. 1 or Fig. 5, although the form shown in Fig. 5 is preferred.

Each of the shutters 17 is provided with pins 18 and 19 at the ends thereof, which pins in the present instance are located above the central longitudinal axis of the shutter, so that if the shutter be supported by the pins 18 and 19 the shutter will assume a substantially vertical position due to the greater weight of the shutter on one side of the axis connecting the pins 18 and 19.

This same result may be obtained when the pins 18 and 19 are located on the central longitudinal axis of the shutter if in some manner a greater weight be provided on one side of such axis than on the other. The only requirement for the shutters operating as described is that there shall be more weight on one side of the longitudinal axis than on the other.

Adjacent each of the ends of the shutters there are cables or attaching devices such as represented at 20 and the pins 18 and 19 in some manner attached to these cables or similar devices 20. The adjacent shutters are positioned with respect to each other such that when the shutters are raised and in substantially vertical position each shutter overlaps its adjacent lower shutter as indicated clearly in Fig. 7.

The cables or similar devices 20 may be attached to the pins 18 and 19 in any desired manner and in Fig. 8 one way is shown comprising plates 21 which are secured on pins 18 and 19 between which the cable may be wound for a turn or two and engaged between the plates so as to securely hold the engaged cable.

The cables 18 and 19 extend up the side members of the frame which will be used in connection with the shutters 17 and these cables will connect with a cable which extends back to the dashboard of a vehicle in a manner similar to that shown in Fig. 1.

The construction and arrangement of shutters which have just been described, will fold into a stack within the bottom member of the frame in substantially and essentially the same manner as that shown in Fig. 3.

It will be obvious that the precise details of construction which have been described may be varied without departing from the spirit of the invention.

Having described my invention, I claim—

An air regulating device for automobile radiators comprising a frame adapted to be secured upon the front of a radiator and having an opening, said frame having substantially vertical side members and a horizontal bottom member, said members being in the form of channels of uniform width with their open sides toward the opening, said side members having longitudinal guideways formed in the bottoms of the channels, a series of flexibly connected shutters mounted in the frame, each shutter being of a height less than the width of the channels, having its ends within the side channels and having pins projecting into the guideways in the bottoms of the side channels, flexible suspension members extending along the opposite ends of the shutters and connected to the pins projecting from the ends thereof, whereby the shutters may be suspended in vertical position one above the other to close the opening, or may fold into horizontal position one upon the other in the bottom channel.

In testimony whereof, I hereunto affix my signature.

GEORGE G. MARSHALL.